US010168774B2

(12) United States Patent
Fisher et al.

(10) Patent No.: US 10,168,774 B2
(45) Date of Patent: Jan. 1, 2019

(54) CUT RESISTANT GLOVE FOR USE WITH CAPACITIVE SENSING DEVICES

(71) Applicant: WELLS LAMONT INDUSTRY GROUP LLC, Niles, IL (US)

(72) Inventors: Angela Fisher, Palatine, IL (US); Dean Bavetta, Philadelphia, MS (US)

(73) Assignee: WELLS LAMONT INDUSTRY GROUP LLC, Niles, IL (US)

( * ) Notice: Subject to any disclaimer, the term of this patent is extended or adjusted under 35 U.S.C. 154(b) by 0 days.

(21) Appl. No.: 14/611,780

(22) Filed: Feb. 2, 2015

(65) Prior Publication Data

US 2015/0220146 A1     Aug. 6, 2015

Related U.S. Application Data

(60) Provisional application No. 61/934,376, filed on Jan. 31, 2014.

(51) Int. Cl.
| | |
|---|---|
| *A41D 19/00* | (2006.01) |
| *D02G 3/36* | (2006.01) |
| *D02G 3/02* | (2006.01) |
| *G06F 3/01* | (2006.01) |
| *A41D 19/015* | (2006.01) |
| *G06F 3/044* | (2006.01) |

(52) U.S. Cl.
CPC ......... *G06F 3/014* (2013.01); *A41D 19/0024* (2013.01); *A41D 19/01505* (2013.01); *G06F 3/044* (2013.01); *A41D 2500/10* (2013.01)

(58) Field of Classification Search
CPC ........... A41D 19/015; A41D 19/01505; A41D 19/01558; D07B 2201/2055
USPC ............................... 2/167; 57/210–222, 200
See application file for complete search history.

(56) References Cited

U.S. PATENT DOCUMENTS

| | | | | |
|---|---|---|---|---|
| 5,248,548 | A * | 9/1993 | Toon | A41D 19/01511 2/167 |
| 5,632,138 | A * | 5/1997 | Liedgens | D01H 9/185 19/159 A |
| 2008/0155730 | A1* | 7/2008 | Goddard | A41D 19/01547 2/161.8 |
| 2011/0047672 | A1* | 3/2011 | Hatfield | A41D 19/0024 2/163 |
| 2013/0076699 | A1* | 3/2013 | Spencer | G06F 3/039 345/179 |
| 2014/0090349 | A1* | 4/2014 | Fisher | D02G 3/367 57/222 |
| 2014/0259285 | A1† | 9/2014 | Andrews | |
| 2014/0283559 | A1* | 9/2014 | Andrews | A41D 19/01505 66/174 |

* cited by examiner
† cited by third party

*Primary Examiner* — Timothy K Trieu
(74) *Attorney, Agent, or Firm* — Levenfeld Pearlstein, LLC

(57) ABSTRACT

A glove for use with capacitive touch screen devices features a main body portion, a finger portion and a thumb portion. At least the finger portion of the glove is constructed from a conductive and cut resistant yarn. The conductive and cut resistant yarn preferably includes a core that includes a cut resistant fiber and a sheath that include a conductive fiber.

7 Claims, 3 Drawing Sheets

CUT RESISTANT GLOVE FOR USE WITH CAPACITIVE SENSING DEVICES

CROSS REFERENCE TO RELATED APPLICATIONS

This application claims priority to U.S. Provisional Patent Application No. 61/934,376, filed Jan. 31, 2014, the entire contents of which are incorporated by reference.

FIELD OF THE INVENTION

The present invention relates generally to gloves and, in particular, to a cut resistant glove for use with capacitive sensing devices.

BACKGROUND

With the rapid growth in demand for touch screen devices, such as phones and computer tablets, there is also a growing need for hand protection that works with capacitive touch screen technology. Capacitive touchscreens are typically made from an insulator such as glass or acrylic coated with a transparent conductor, often ITO or indium tin oxide. Capacitive touchscreen devices work when a conductive object comes into contact with the screen and distorts the screen's electrostatic field, ultimately measuring a change in capacitance. Since the human body is a conductor, the conductive object that comes into contact with the screen may be a user's finger. There are various technologies to determine the location of the conductive contact. The location of the touch is then processed by the touch screen device and converted to some form of output that is then used by the device to initiate various functionality. It is known that, unlike resistive touchscreen devices, capacitive touchscreens cannot be used with standard gloves.

Workers in industrial manufacturing, including those that work in clean rooms, now require cut resistant hand protection. This hand protection is sometimes worn on its own or under a disposable glove. The industry is requesting enhanced forms of hand protection that also function with capacitive touch screen devices so that the hand protection does not need to be removed when working with electronic touchscreen devices.

A need exists for a glove that addresses the above issues.

DETAILED DESCRIPTION OF EMBODIMENTS

Embodiments of the present invention allow workers to wear protective gloves that work with capacitive touch screens in work environments also requiring cut protection.

All of the embodiments described below apply to the designs preferred for the conductive, cut resistant knit glove of the present invention.

Figure 1:
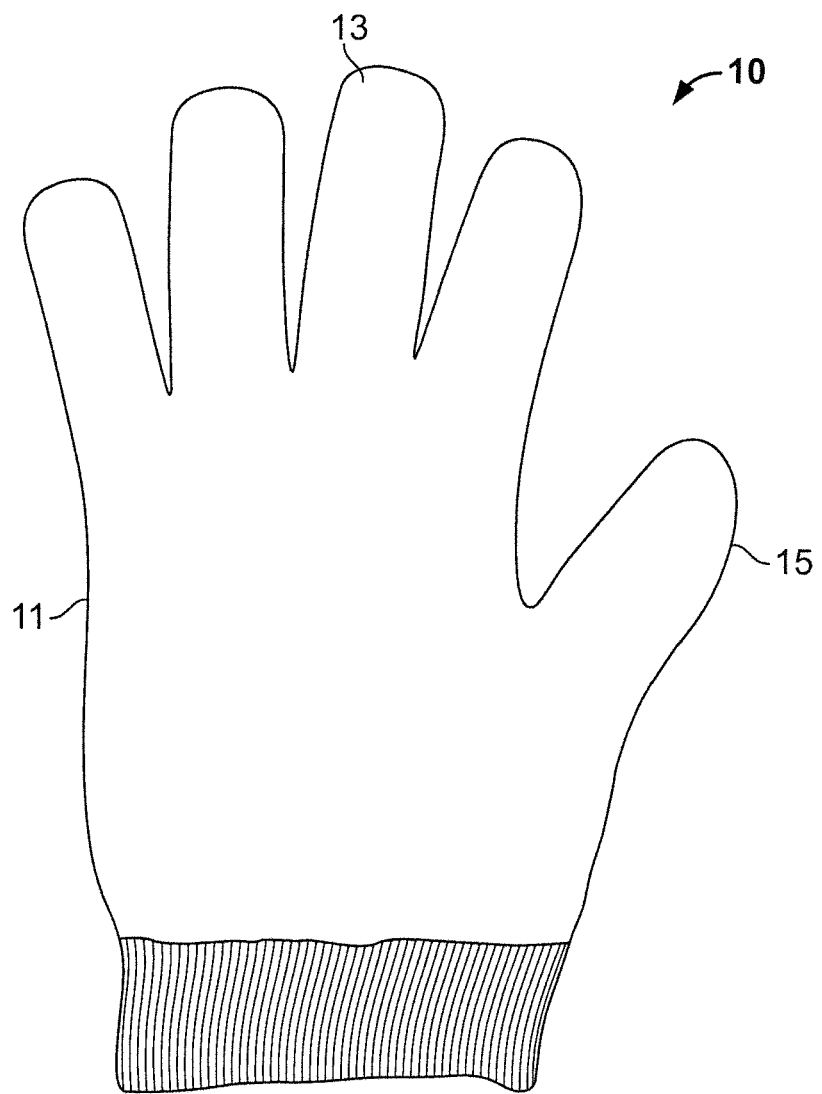
FIG. 1 is a front elevational view of an embodiment of the glove of the present invention.

With reference to FIG. 1, an embodiment of the glove of the present invention is indicated in general at 10 and includes a main body portion 11, which encloses the palm and back of a wearer's hand, finger portions 13 and a thumb portion 15. As illustrated in FIG. 1, the glove preferably features a seamless knit construction formed from cut resistant yarn that may be a core-spun yarn.

Figure 2:
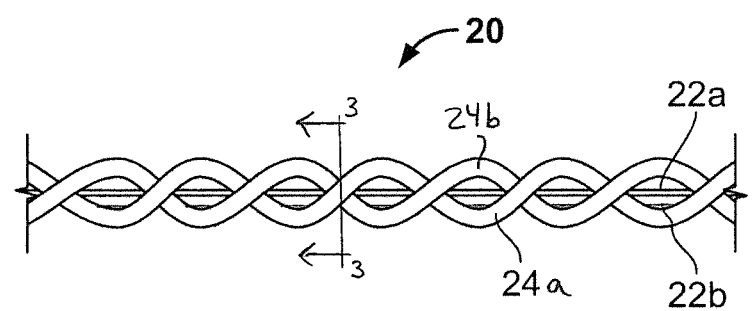
FIG. 2 is an enlarged, side elevational view of a section of the yarn in an embodiment of the glove of the present invention.
Figure 3:
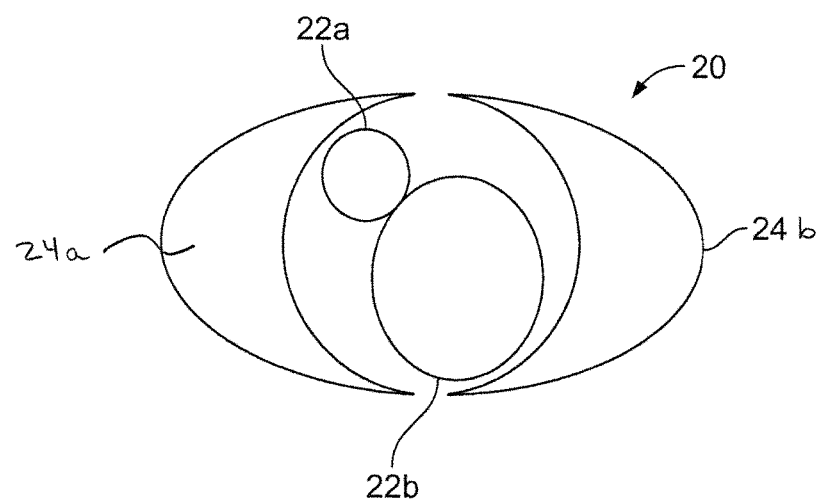
FIG. 3 is an enlarged, cross sectional view of yarn taken along lines 3-3 of FIG. 2.

A section of an embodiment of the yarn of the glove, is indicated in general at 20 in FIGS. 2 and 3. The glove preferably features a construction where the cut resistant yarn 20 is a composite yarn with a core constructed of filaments 22a and 22b and a sheath layer constructed of one or more filaments 24a and 24b. Core filaments 22a and 22b may optionally be core-spun. In addition, sheath filaments 24a and 24b may be core-spun around a single or multiple fiber core. Furthermore, while two filaments are illustrated in FIGS. 2 and 3, the core may instead be a single filament. Sheath filaments may include one type of fiber material, or a number of different types of fiber material.

At least one of the core fibers is a conductive fiber. For example, stainless steel is a preferred core fiber 22a to provide both electrical conductivity and cut resistance. The ideal stainless steel content is 5% to 20% of the total weight of all fiber in the composite yarn. As an example only the stainless steel core filament may have a diameter of 0.0016 inches. Stainless steel may also be used as a sheath fiber 24a and 24b. Alternative conductive fibers for either the core or sheath include copper, aluminum and other metallic fibers.

Nylon is the preferred sheath fiber 24a and 24b due to its positive position in the triboelectric series. As a result, the nylon fiber functions well in transferring charges from one conductor to another: from the wearer's finger to the stainless steel core fiber 22a to the touch screen device 30, as illustrated in FIG. 4.

Figure 4:
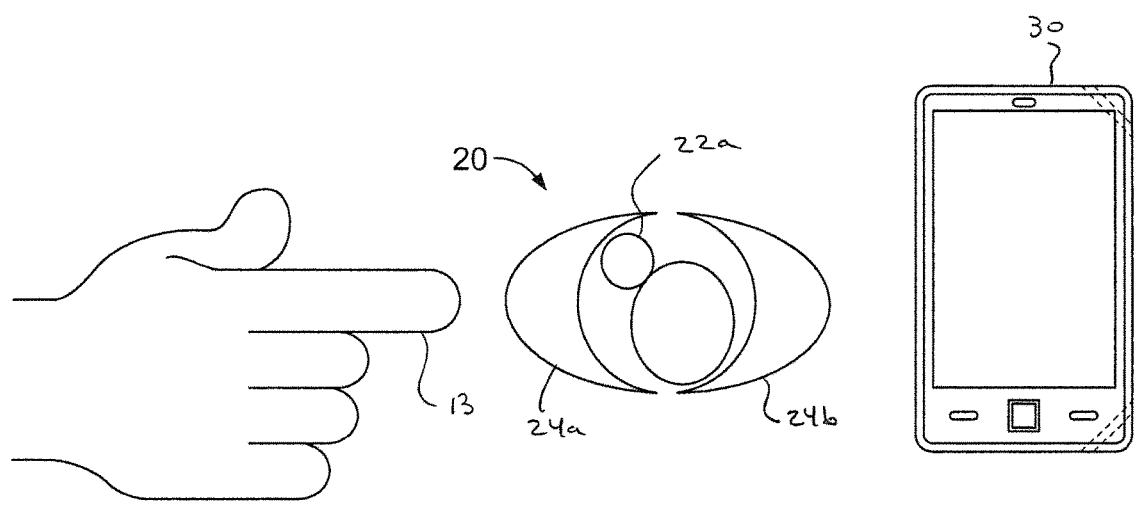
FIG. 4 is an illustration illustrating use of the glove of FIGS. 1-3.

Polyester fiber, or another synthetic fiber, may be used in the core, as illustrated at 22b in FIGS. 2-4, or sheath to add bulk, comfort and other properties such as flame resistance or antimicrobial features to the composite yarn composition. As examples only, the polyester fibers 22b may be textured or flat filaments or a monofilament.

The preferred final composite yarn density for knitting the glove is 200 denier to 2000 denier, while the preferred needle knitting gauge is 10 to 18 needles per inch.

Preferred fiber materials are as follows:

Nylon—conductive material

Stainless Steel (Filament, Spun and Staple)—conductive material

Fiberglass—cut resistant

In addition, fibers constructed of polyester or other synthetic fibers, aramid and/or high density polyethylene may be used as filler materials for both the core and sheath. Of course fibers constructed from alternative materials having properties similar to the above materials may be used.

In alternative preferred embodiments, core fiber 22a could be a nylon filament (with or without polyester filament 22b), while the sheath filaments 24a and 24b could include both nylon filaments and stainless steel filaments or solely stainless steel filaments.

The finished conductive yarns of FIGS. 2-4, and those otherwise described above, are used to knit a glove, such as the one illustrated in FIG. 1, and is conductive in nature. For example, the yarn may demonstrate $10^3$ to $10^7$ Ohms of conductivity.

In addition, preferred embodiments of the glove will function with capacitive sensing devices through a nitrile or latex membrane up to 10 mm in thickness. Such membranes would be typically worn over the glove and be disposable.

Furthermore, the final yarn used to knit the glove will be cut resistant in nature.

Figure 5:
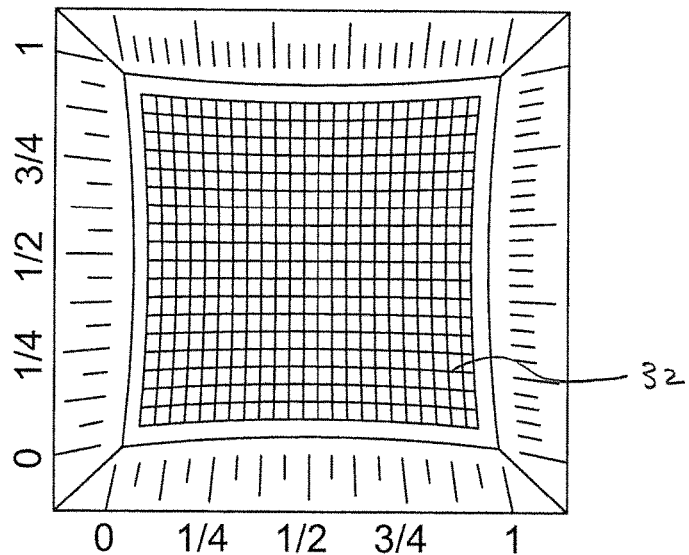
FIG. 5 is an enlarged partial view of the knit structure of the glove of FIG. 1 made using the yarn of FIGS. 2 and 3A.
Figure 6:
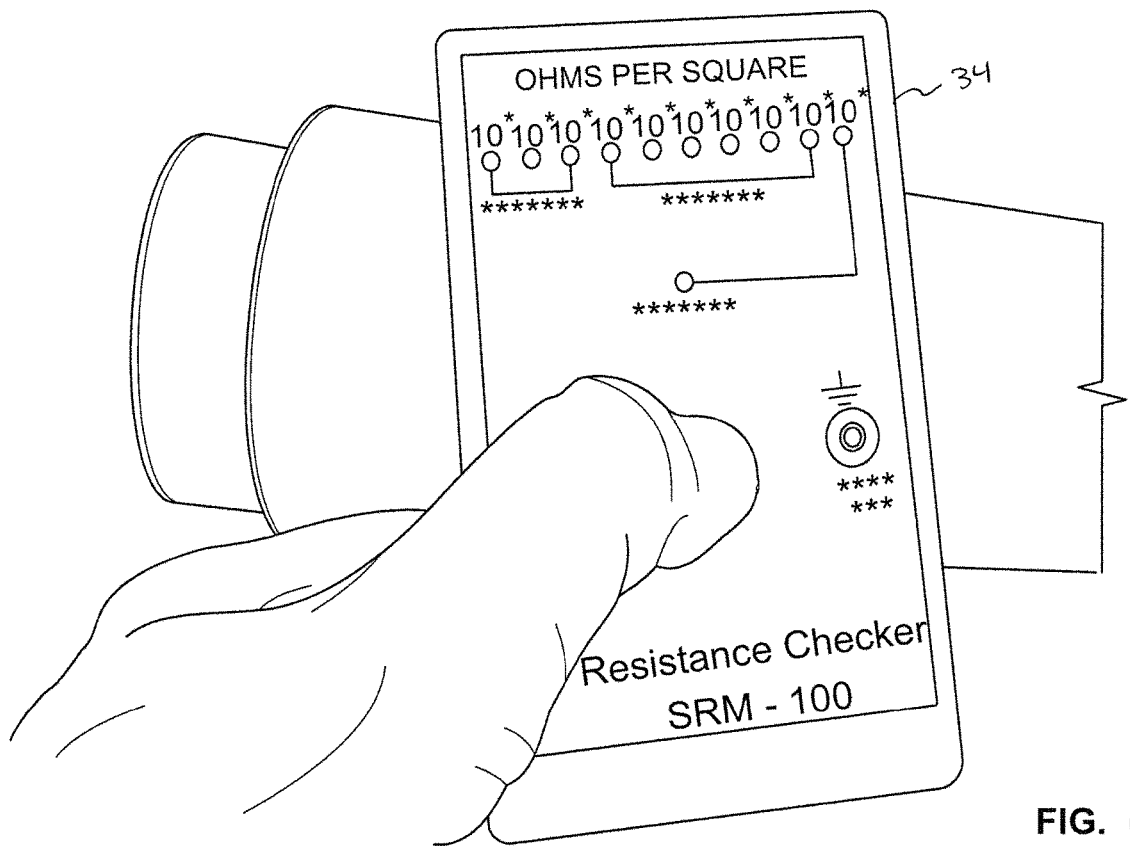
FIG. 6 is a perspective view of a resistance tester of the type used to test the glove of FIGS. 1-4.

As an example only, an image of the stitches per inch and knit structure of an embodiment of the fabric 32 in an embodiment of the glove of the present invention is illustrated in FIG. 5, which makes use of the construction illustrated in, and described with respect to, FIG. 2. The yarn and gloves were tested for conductivity using a CE (Common Emitter) Resistance Tester, of the type illustrated at 34 in FIG. 6. Other types of resistant testers may alternatively be used. The samples were also cut tested using a CPP (Cut Protection Performance) Tester as specified in ASTM F1790. The results of such testing are presented in Table 1 below. Results of such testing indicated an ANSI level 2 cut resistance, but yarn blends that will yield an ANSI level 3, and other cut resistance levels, including higher and lower, are available for the glove of the invention.

TABLE 1

| Cut Protection Performance Test (CPPT) Results CPPT Test Results ASTM F1790-97 (25 mm Test) | |
| --- | --- |
| Grams | 804 |
| Lbs | 1.77 |
| ANSI Level | 2 |
| R2 | 0.975 |

While the preferred embodiments of the invention have been shown and described, it will be apparent to those skilled in the art that changes and modifications may be made therein without departing from the spirit of the invention, the scope of which is defined by the following claims.

What is claimed is:

1. A glove for use with capacitive touch screen devices comprising: a main body portion; a finger portion; a thumb portion; and at least said finger portion constructed from a composite yarn, the composite yarn having a core and a sheath, the core being formed from a cut resistant fiber is wrapped around by the sheath being formed from a conductive fiber, wherein the conductive fiber content is in a range of 5% to 20% of a total weight of fibers in the composite yarn, wherein the composite yarn has a density in a range of 200 denier to 2000 denier, wherein the composite yarn has a conductivity in a range of $10^3$ to $10^7$ Ohms/meter, and wherein the core cut resistant fiber includes stainless steel; wherein the sheath further includes a cut resistance fiber; wherein the core conductive fiber further includes nylon and the sheath cut resistant fiber includes stainless steel.

2. The glove of claim 1 wherein the main body, finger and thumb portions feature a seamless knit construction.

3. The glove of claim 1 wherein the sheath conductive fiber includes nylon.

4. The glove of claim 1 wherein the core is a core-spun core.

5. The glove of claim 1 wherein the composite yarn has a core-spun construction.

6. The glove of claim 1 wherein the core includes stainless steel and polyester fibers and the sheath includes nylon fibers.

7. The glove of claim 1 wherein the composite yarn has a needle knitting gauge in a range of 10 to 18 needles per inch.

* * * * *